US009830157B2

(12) United States Patent
Gupta et al.

(10) Patent No.: US 9,830,157 B2
(45) Date of Patent: Nov. 28, 2017

(54) SYSTEM AND METHOD FOR SELECTIVELY DELAYING EXECUTION OF AN OPERATION BASED ON A SEARCH FOR UNCOMPLETED PREDICATE OPERATIONS IN PROCESSOR-ASSOCIATED QUEUES

(75) Inventors: Gagan Gupta, Fitchburg, WI (US); Gurindar S. Sohi, Madison, WI (US); Srinath Sridharan, Madison, WI (US)

(73) Assignee: Wisconsin ALumni Research Foundation, Madison, WI (US)

( * ) Notice: Subject to any disclaimer, the term of this patent is extended or adjusted under 35 U.S.C. 154(b) by 1575 days.

(21) Appl. No.: 12/858,907

(22) Filed: Aug. 18, 2010

(65) Prior Publication Data
US 2012/0047353 A1 Feb. 23, 2012

(51) Int. Cl.
G06F 9/30 (2006.01)
G06F 9/38 (2006.01)
G06F 9/44 (2006.01)
G06F 9/45 (2006.01)
G06F 9/48 (2006.01)
G06F 9/50 (2006.01)

(52) U.S. Cl.
CPC ............ *G06F 9/3838* (2013.01); *G06F 8/314* (2013.01); *G06F 8/456* (2013.01); *G06F 8/458* (2013.01); *G06F 9/4881* (2013.01); *G06F 9/5033* (2013.01); *G06F 9/5038* (2013.01)

(58) Field of Classification Search
CPC ........................... G06F 9/30087; G06F 9/3838

USPC .................................................. 712/216, 220
See application file for complete search history.

(56) References Cited

U.S. PATENT DOCUMENTS

| 5,517,628 | A | * | 5/1996 | Morrison et al. ............. 712/234 |
| 5,941,983 | A | * | 8/1999 | Gupta et al. .................. 712/214 |
| 6,950,927 | B1 | * | 9/2005 | Apisdorf et al. ............. 712/216 |
| 7,571,301 | B2 | * | 8/2009 | Kejariwal et al. ............ 712/215 |
| 8,086,826 | B2 | * | 12/2011 | Brown et al. .................. 712/214 |
| 8,381,203 | B1 | * | 2/2013 | Beylin et al. ................. 717/150 |
| 2004/0226011 | A1 | * | 11/2004 | Augsburg ........... G06F 9/30123 718/100 |
| 2010/0070740 | A1 | | 3/2010 | Allen et al. |

OTHER PUBLICATIONS

Allen, Matthew D., et al., Serialization Sets: A Dynamic Dependence-Based Parallel Execution Model, Technical Report #1644, Aug. 2008, pp. 1-10, Computer Sciences Department, University of Wisconsin-Madison, Madison, Wisconsin, USA.
Allen, Matthew D., et al., Metadata-Based Parallelization of Program, Aug. 10, 2007, pp. 1-10, Computer Sciences Department, University of Wisconsin-Madison, Madison, Wisconsin, USA.

(Continued)

*Primary Examiner* — David J Huisman
(74) *Attorney, Agent, or Firm* — Boyle Fredrickson, S.C.

(57) ABSTRACT

A system and method of parallelizing programs employs runtime instructions to identify data accessed by program portions and to assign those program portions to particular processors based on potential overlap between the access data. Data dependence between different program portions may be identified and used to look for pending "predicate" program portions that could create data dependencies and to postpone program portions that may be dependent while permitting parallel execution of other program portions.

16 Claims, 8 Drawing Sheets

(56) References Cited

OTHER PUBLICATIONS

Rinard, Martin C., The Design, Implementation and Evaluation of Jade: A Portable, Implicitly Parallel Programming Language, A Disseration Submitted To The Department Of Computer Science And The Committee On Graduate Studies Of Stanford University In Partial Fulfillment Of The Requirements For The Degree Of Doctor Of Philosophy, Sep. 1994, pp. 1-268, Palo, Alto, CA, USA.

Pochayevets, Oleksandr, BMDFM: A Hybrid Dataflovv Runtime Parallelization Environment for Shared Memory Multiprocessors, Thesis in Computer Engineering, Technische Universitat Munchen, Institut fur Informatik, Lehrstuhl fur Rechnertcehcnik und Rechnerorganisation, 2006, pp. 1-170, Munich, Germany.

* cited by examiner

SYSTEM AND METHOD FOR SELECTIVELY DELAYING EXECUTION OF AN OPERATION BASED ON A SEARCH FOR UNCOMPLETED PREDICATE OPERATIONS IN PROCESSOR-ASSOCIATED QUEUES

STATEMENT REGARDING FEDERALLY SPONSORED RESEARCH OR DEVELOPMENT

This invention was made with the United States government support awarded by the following agencies:

NSF 0702313

The United States government has certain rights to this invention.

BACKGROUND OF THE INVENTION

The present invention relates to the implementation and execution of programs for multi-processor computers and in particular to a software system providing parallelization of programs.

Improvements in software performance have been realized primarily through the use of improved processor designs. Such performance improvements have the advantage of being completely transparent to the program generator (for example, a human programmer, compiler, or other program translator). However, achieving these benefits depends on the continuing availability of improved processors.

Parallelization offers another avenue for software performance improvement by dividing the execution of a software program into multiple components that can run simultaneously on a multi-processor computer. As more performance is required, more processors may be added to the system, ideally resulting in attendant performance improvement. However, generating parallel software is very difficult and costly. Accordingly, parallelization has traditionally been relegated to niche markets that can justify its costs.

Recently, technological forces have limited further performance improvements that can be efficiently realized for individual processors. For this reason, computer manufacturers have turned to designing processors composed of multiple cores, each core comprising circuitry (e.g., a CPU) necessary to independently perform arithmetic and logical operations. In many cases, the cores also support multiple execution contexts, allowing more than one program to run simultaneously on a single core (these cores are often referred to as multi-threaded cores and should not be confused with the software programming technique of multi-threading). A core is typically associated with a cache and an interconnection network allowing the sharing of common memory among the cores; however, other "shared memory" architectures may be used, for example those providing exclusive memories for each processor with a communication structure. These multi-core processors often implement a multi-processor on a single chip. Due to the shift toward multi-core processors, parallelization is supplanting improved single processor performance as the primary method for improving software performance.

Improved execution speed of a program using a multi-processor computer depends on the ability to divide a program into portions that may be executed in parallel on the different processors. Parallel execution in this context requires identifying portions of the program that are independent such that they do not simultaneously operate on the same data. Of principal concern are portions of the program that may write to the same data, "write-write" dependency, and portions of the program that may implement a reading of data subsequent to a writing of that data, "read-write" dependency, or a writing of data subsequent to a reading of the data, "write-read" dependency. Errors can result if any of these reads and writes change in order as a result of parallel execution. While parallel applications are already common for certain domains, such as servers and scientific computation, the advent of multi-core processors increases the need for many more types of software to implement parallel execution to realize increased performance.

Many current programs are written using a sequential programming model, expressed as a series of steps operating on data. This model provides a simple, intuitive programming interface because, at each step, the generator of the program (for example, the programmer, compiler, and/or some other form of translator) can assume the previous steps have been completed and the results are available for use. However, the implicit dependence between each step obscures possible independence among instructions needed for parallel execution. To statically parallelize a program written using the sequential programming model, a compiler must analyze all possible inputs to different portions of the program to establish their independence. Such automatic static parallelization works for programs which operate on regularly structured data, but has proven difficult for general programs. In addition, such static analysis cannot identify opportunities for parallelization that can be determined only at the time of execution when the data being read from or written to can be positively identified.

U.S. patent application Ser. No. 12/543,354 filed Aug. 18, 2009 (the "Serialization" patent) now issued as U.S. Pat. No. 8,417,919 and assigned to the same assignee as the, present invention and hereby incorporated by reference, describes a system for parallelizing programs. written using a sequential program model, during an execution of that program. In this invention, "serializers" are associated with groups of instructions ("computational operations") to be executed before execution of their associated computational operations. The serializers may thus positively identify the data accessed by the computational operation to assign the computational operation to a particular processing queue. Computational operations operating on the same data are assigned to the same queue to preserve their serial execution order. Computational operations operating on disjoint data may be assigned to different queues for parallel execution. By performing the parallelization during execution of the program, many additional opportunities for parallelization may be exploited beyond those which may be identified statically.

This serialization method may also be used where the data sets of computational operations are not completely disjoint through the use of a "call" instruction which collapses parallel execution when a data dependency may exist, causing the program to revert to conventional serial execution. This approach slows executions of concurrent parallel instruction groups and limits the discovery of potential parallelism downstream from the "call" instruction while the "call" is in force.

SUMMARY OF THE INVENTION

The present invention provides an improvement to the above referenced serialization patent permitting the serializer to also use identified data dependencies among computational operations to enforce serial processing only for the possibly dependent computational operations and without limiting the discovery and exploitation of parallelism in other and later computational operations. In one embodiment, this is accomplished by enqueuing "synchronizing operations" into the queues normally holding computational operations ("predicate computational operations") on which later computational operations are dependent. The later, dependent computational operations wait until the synchronizing operations are executed before beginning their execution. In this way focused serialization may be implemented without loss of broader parallelization.

One embodiment of the present invention provides a method of parallel execution of a program having a serial execution order on a multi-processor computer having memory. The method includes the steps of identifying in the program a plurality of computational operations potentially writing to data in memory read by other predicate computational operations, or potentially reading data in memory written by other predicate computational operations such as would create data dependencies between computational operations, and providing a set of execution queues holding computational operations for ordered execution by associated processors. A given computational operation is assigned to a given execution queue based on identification of a data set accessed by the given computational operation at a point of the given computational operation in the serial execution order. A search is conducted for at least one uncompleted predicate computational operations of the given computational operation. When the search does not find at least one uncompleted predicate computational operation, the given computational operation is assigned for execution on a processor, but when the interrogation does find at least one uncompleted predicate computational operation, execution on a processor is delayed until completion of execution of the predicate computational operations found in the search.

It is thus a feature of at least one embodiment of the invention to handle potential dependencies between computational operations in a way that permits delay only of computational operations subject to such dependency.

The process of delaying a computational operation may enroll a synchronizing operation in other execution queues possibly holding a predicate computational operation. The execution of the given computational operation may be delayed until the synchronizing operations have been executed by the processors associated with the execution queues holding the synchronizing operations.

It is thus a feature of at least one embodiment of the invention to delay execution of given computational operations until the completion of earlier computational operations writing values used by the given computational operations to thereby respect "read-write" dependencies.

It is thus a feature of at least one embodiment of the invention to provide a simple method of delaying computational operations where the method can be performed by the executing processors themselves with minimal overhead.

The synchronizing operations may toll a counter as they are executed, the counter providing an indication to synchronizing operations when its number of tollings equals a number of other execution queues identified so that the synchronizing operations may assign the given execution queue to a processor upon the indication.

It is thus a feature of at least one embodiment of the invention to provide a decentralized method of coordinating the execution of dependent computational operations where there are multiple dependencies.

The method may further delay execution of later computational operations positioned after the synchronizing operations in queue order in the other execution queues until completion of the given computational operation.

It is thus a feature of at least one embodiment of the invention to prevent the execution of computational operations positioned after the synchronization operations in execution queues until the completion of the current operation to honor the "write-read" dependency.

It is thus a feature of at least one embodiment of the invention to prevent the execution of later operations on the same data of the predicate operation under the assumption that these later computational operations are "write-read" dependent on the given computational operation.

Synchronizing operations placed in any execution queues holding at least one predicate computational operation, when executed, may remove the queue of the later computational operations in those execution queues until completion of the given computational operation.

It is thus a feature of at least one embodiment of the invention to permit the mechanism of synchronizing operations to handle the de-queuing of dependent computational operations, again, permitting decentralized control of the parallelizing process.

The computational operations may be selected from the group consisting of: program functions and program object methods.

It is thus a feature of at least one embodiment of the invention to provide a parallelizing method that takes advantage of the structure of common functions and instantiable objects to find parallelization.

When the given computational operation is an instantiated software object, the given computational operation may be assigned to a given execution queue based on an instantiation number.

It is thus a feature of at least one embodiment of the invention to exploit the well defined scope of data in software objects to permit parallel execution.

The method of the invention may be performed only if at least one processor that can be assigned an execution queue is not executing computational operations.

It is thus a feature of at least one embodiment of the invention to eliminate parallelization overhead if all processors are effectively allocated.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DETAILED DESCRIPTION OF THE PREFERRED EMBODIMENT

Figure 1:
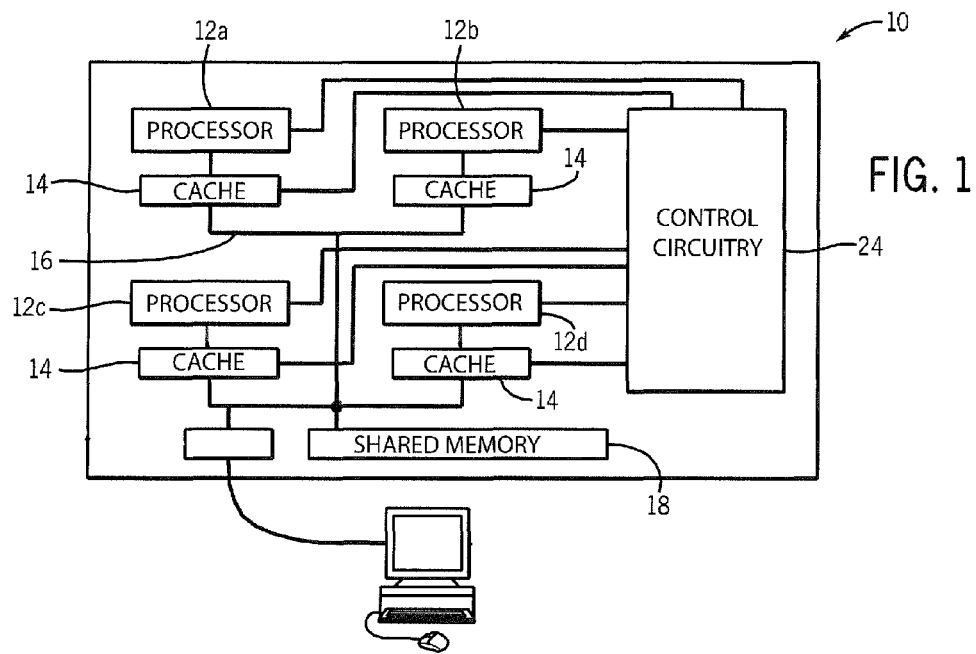
FIG. 1 is a simplified representation of the physical architecture of a multi-processor system having four processors and being one type of multiprocessor system suitable for implementation of the present application.

Referring now to FIG. 1, a multi-processor system 10 may include, for example, four processors 12a-12d each associated with a local memory 14 and communicating on an interconnection network structure 16 with shared memory 18. It will be understood that the present application applies to cases where the local memory 14 and shared memory 18 are managed automatically by hardware (i.e., local memory 14 is a cache), as well as cases where software must explicitly perform transfers among shared memory 18 and local memories 14. It will be further understood that shared memory 18 may in turn communicate with additional external memory (not shown) or in fact may be comprised totally of local memories 14 through communication protocols. Each of the processors 12 may also communicate with common control circuitry 24 providing coordination of the processors 12 as is understood in the art.

Although the present application is described with respect to a multi-processor implemented as separate processors communicating with shared memory, it will be understood that the term multi-processor includes any type of computer system providing multiple execution contexts, including, but not limited to, systems composed of multi-threaded processors, multi-core processors, heterogeneous computational units, or any combination thereof.

Figure 2:
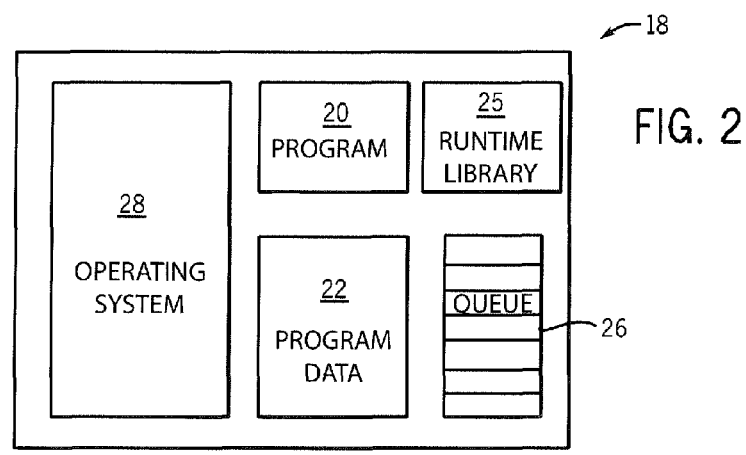
FIG. 2 is a simplified representation of the software elements of the present invention including a modified sequential model program, associated libraries and queue structures.

Referring now to FIG. 2, the shared memory 18 may hold a sequential model program 20, modified according to the present invention as will be described, and program data 22 accessed via the program 20 during execution. Shared memory 18 may further include runtime library 25 possibly providing class specifications (i.e., object prototypes), pre-defined serializers, generators for ordered communication structures (e.g., queues), and code to implement the runtime operations of delegate threads, described in further detail herein below. The shared memory 18 may also include actual queues 26 as will be described below, and an operating system 28 providing execution context for the above as will generally be understood in the art.

Figure 3:
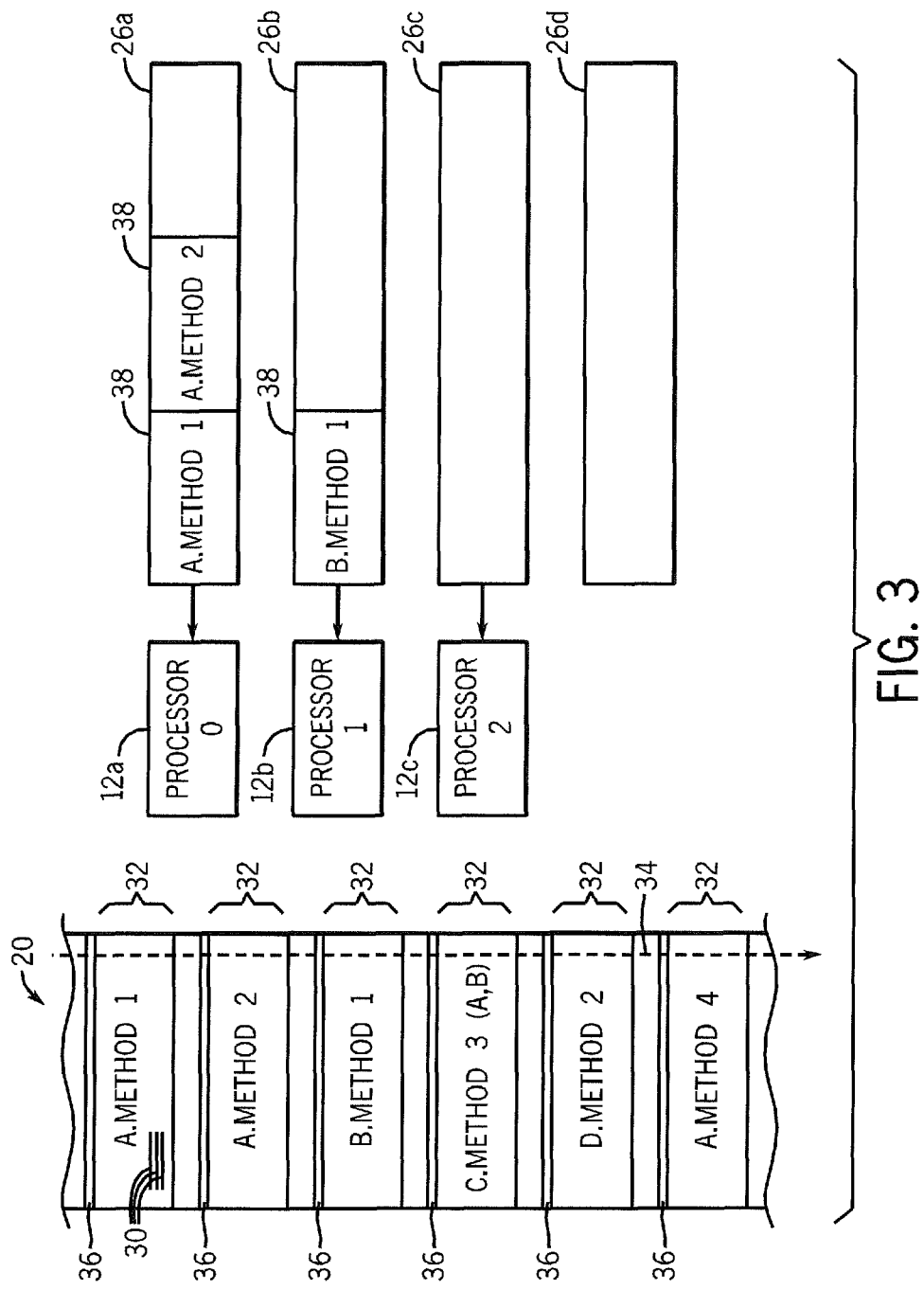
FIG. 3 is a logical diagram of the sequential model program of FIG. 2 showing computational operations comprised of groups of instructions labeled by the program generator (a human or possibly a software pre-processor) for use in serialization and the allocation of the computational operations to different queues in a queue order for execution on different processors.

Referring now to FIG. 3, the sequential model program 20 may comprise multiple computer executable instructions 30 collected in computational operations 32 designated in the figure as "methods". The sequential model program 20 thus represents a program prepared using standard languages to logically execute serially on a single processor. The "methods" may be, for example, program functions operating on particular data or software objects that may be instantiated with an instance number to execute on data associated with that object and instance number. As depicted, each method is designated with a prefix letter which in the case of objects indicates a unique object template or class and a suffix number indicating an instantiation of that object. Thus, the designation "A.method 1" may represent a first instantiation of an object A, an equivalent function, or the like.

The computational operations 32 of the serial model program 20, if executed on a single processor, will follow a serial execution order 34. The serial execution order 34 is generally resolved only during execution of the serial model program 20 after flow control instructions in the serial model program 20 are resolved using actual data. For this reason the serial execution order 34 will generally differ from the program order, for example, expressed in the source code of the serial model program 20. More generally, the serial execution order 34 is the order in which the serial model program 20 would execute without the parallelization of the present invention and the order in which all dependencies between instructions are properly resolved by the order of instruction execution.

The present invention associates each computational operation 32 with a serializer 36 shown here as placed in-line in the serial model program 20 but in practice only being logically so positioned. Generally, before execution of the computational operations 32 (and in one embodiment at the logically, immediately preceding instruction) according to the serial execution order 34, a serializer will determine a serialization set to which the computational operation 32 belongs, most simply by examining the data read or written to by the computational operation 32. The serialization set is selected to ensure that computational operations 32 assigned to different serialization sets write to different data. In this way, computational operations 32 associated with different serialization sets may be independently executed in parallel without data dependency problems. One simple serialization technique looks at the instance number of the object and uses that as a serialization set identifier. Other serialization set approaches are described in the above referenced serialization patent application.

The serializer 36 may be assisted in the serialization process by a label or call to the serializer 36 that identifies the potential parallelization of a computational operation 32 and exposes its data dependencies. For example, the serializer for the line C.method 3 (A,B) in FIG. 3 may be in the form of a single line, C.dep_delegate(A, B, method 3) that calls library function dep_delegate to perform the serialization process, and where data A and B are accessed by C.method 3. This information is similar to the designation of input parameters in conventional programming languages and imposes no significant additional burden.

Each computational operation 32 assigned to a serialization set number may be enrolled in one of the queues 26 which may be associated with a given processor 12 (as in the case of queues 26a-26c) or may be unassociated (de-queued) (as in the case of queue 26d). For example, a first computational operation 32 of A. method 1 may be assigned to queue 26a associated with processor 0. A.subsequent second occurrence of computational operation 32 of A.method 2 is also assigned to queue 26a also associated with processor 0 because the second occurrence of computational operation 32 of A.method 2 operates on the same data not disjoint with the data of the previous execution.

In contrast, subsequent execution of computational operation 32 of B.method 1 may be assigned to queue 26b associated with processor 1 because this different object is associated with a different set of data in its instantiation.

Figure 4:
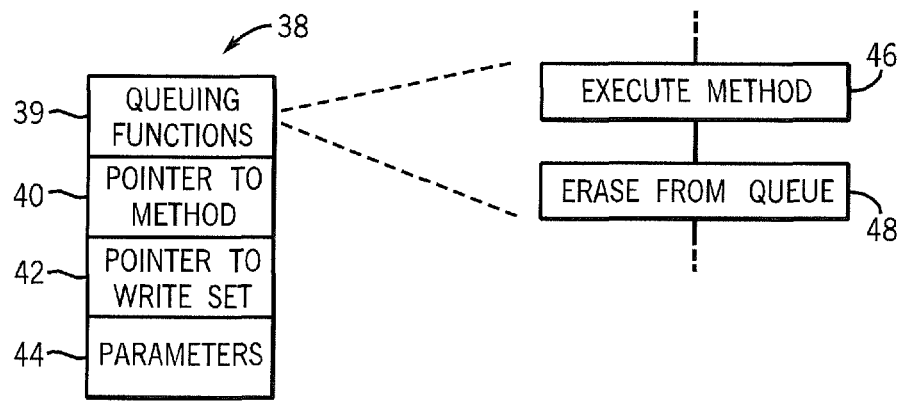
FIG. 4 is an example of a placeholder operation representing a given computational operation in a queue, for example from the library of FIG. 2, of the type used for computational operations without data dependencies with other computational operations.

The assignment of the computational operation 32 to a queue 26 enrolls a placeholder operation 38 associated with the computational operation 32 into the queue 26. Referring to FIG. 4, a simple placeholder operation 38 will generally include instructions that implement queuing functions 39 as will be described below, a pointer 40 to the particular method implemented by the computational operation 32 (most simply a pointer to the computational operation 32 or its class structure and instantiation data), a pointer 42 to the write set being the data written to by the computational operation 32 and hence driving its serialization set identification, and a queue number and any parameters 44 necessary for execution of the computational operation. Parameters are data that may not be subject to sharing between computational operations 32, for example, as may be evident statically before running of the program.

The queuing functions 39 are relatively simple for the basic placeholder operation 38 used with computational operation 32 that is disjoint in its data access with other computational operations 32. These queuing functions 39 transfer control to the underlying computational operation 32 when the placeholder operation 38 is executed (per process block 46) and delete the placeholder operation 38 from the queue (per process block 48) after it has been executed.

Figure 5:
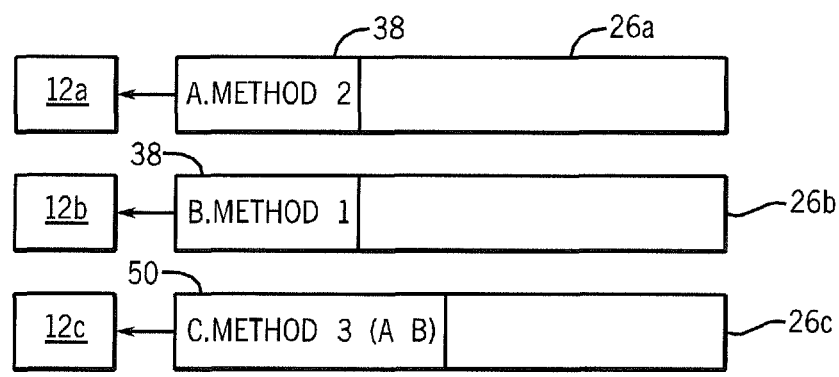
FIG. 5 is a diagram showing a state of processors and queues for a set of computational operations.

Referring now to FIG. 5, a given computational operation 32 may be designated by the program generator or serializer 36 to indicate not only the data associated with the object (for example to the instantiation number of the object) but also other "predicate" computational operations 32 that may write data on which the current "dependent" computational operation is dependent. In this example, computational operation 32 of C.method 3(A B) identifies a data dependency on objects A and B. Generally this data dependency is expressed broadly during program generation, for example, in terms of objects rather than object instances, and thus will be overbroad to fully include any possible data dependency that may occur during run-time. Final decisions about executing computation operations in parallel are made as the program executes.

Figure 6:
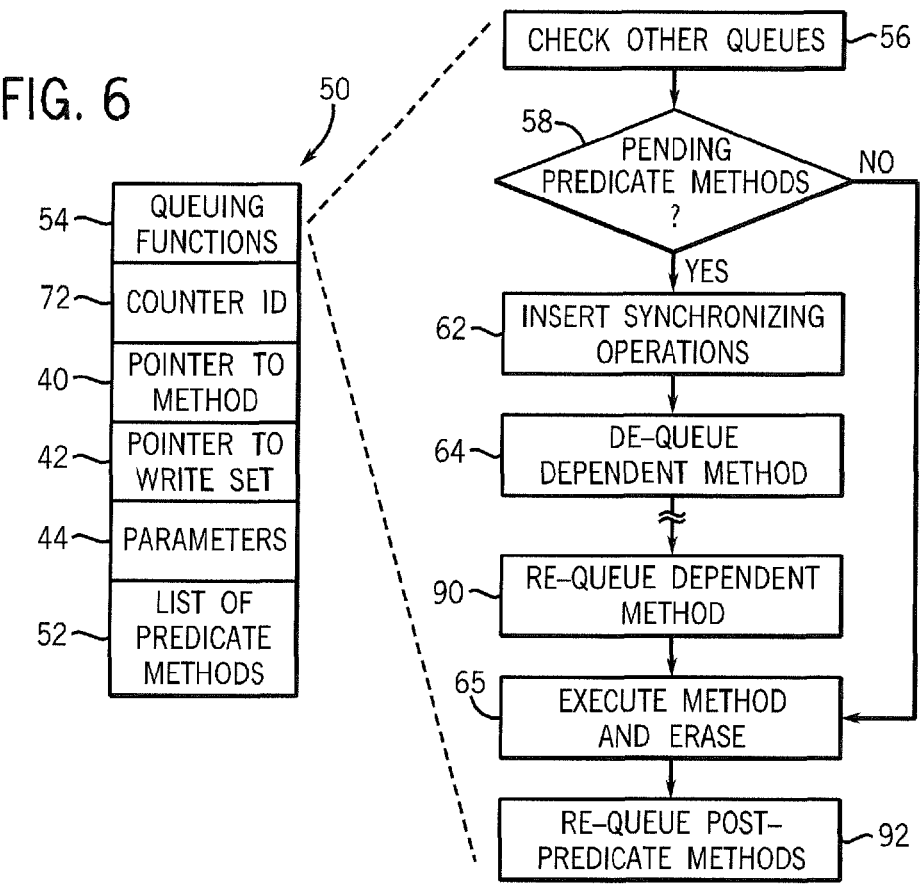
FIG. 6 is a figure similar to that of FIG. 4 showing an example placeholder operation for computational operations with read-write data dependencies with other computational operations.

Referring to FIGS. 5 and 6, computational operation 32 of C.method 3(A B) may also be serialized based on its new object class (suggesting that its accessed data is disjoint with objects from classes A and B) and thus assigned to queue 26c for parallel execution. Coincidentally, at this time, processor 12a may have fully executed computational operation 32 of A.method 1 and the placeholder operation 38 for this method is removed from the queue 26a.

The placeholder operations 50 generated for the computational operation 32 of C.method 3(A B) which exhibits dependency with other objects differ somewhat from the computational placeholder operations 38 for computational operations 32 as previously described which exhibit no such dependency. Like placeholder operation 38, placeholder operation 50 provides a pointer 40 to the method of the computational operation 32 and a pointer 42 to the write set (being the data space, for example, of the object C.method 3) and a list of parameters 44. In addition, however, placeholder operation 50 provides a list 52 of the other predicate computational operations on which this particular computational operation 32 C.method 3 is dependent (in this case, objects A and B).

The placeholder operation 50 also includes queuing functions 54 which when executed identify any queues 26 holding placeholder operations 38 for the predicate computational operations (e.g. A and B) per process block 56. This identification of queues 26 checks at least some other queues 26 (both those associated with a processor 12 and those unassociated with a processor 12). If at the time of execution of the computational operation 32 of C.method 3(A B) (e.g. the time of execution of the placeholder operation 50) there are no other queues 26 holding predicate placeholder operations 38, then per decision block 58, computational operation 32 of C.method 3(A B) may be executed per process block 65.

Figure 7:
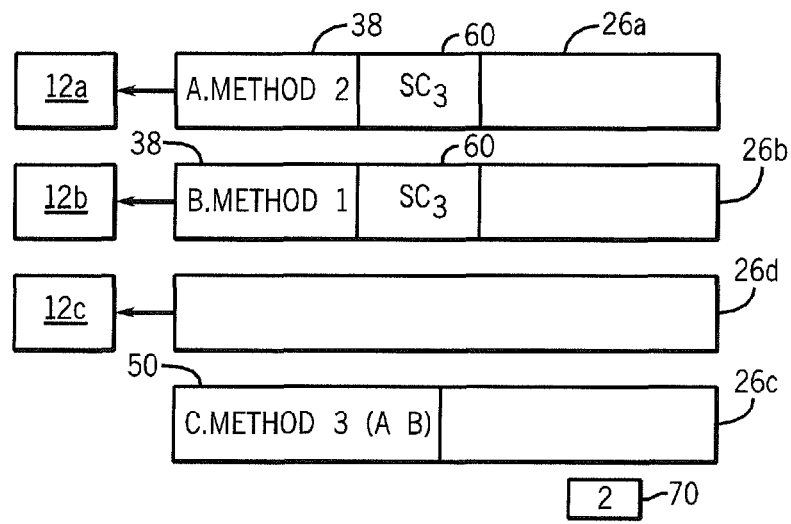
FIG. 7 is a figure similar to FIG. 5 showing queues with synchronization operations inserted therein and a de-queuing of a dependent computational operation.

In this present example, however, as illustrated in FIG. 7, placeholder operations 38 for both predicate computational operations A and B are in active queues 26 and accordingly, per process block 62 of the queuing functions 54, synchronization operations ($SC_3$) 60 are inserted in the queues 26a and 26b associated with the predicate computational operations A and B. At process block 64, the computational operation 32 of C.method 3(A B) is de-queued, effectively removing it and all other subsequent operations in its queue 26c from execution by processor 12c. Note that "de-queuing" as described above does not in fact remove placeholder operations 38 and 50 from the queue but simply disconnects the queue 26 from execution by its associated processor 12.

The above example describes the discovery of predicate computational operations that represent "read-write" dependencies. As will be described further below, process block 56, may also identify queues 26 for predicate computational operations that represent "write-read" dependencies. In both cases, per process block 58 and 62, synchronizing operations will be inserted into the identified queues 26 and the dependent computational operation de-queued.

Referring still to FIGS. 6 and 7, at the time of insertion of the synchronization operations 60 into the queues 26 at process block 62, a counter 70 is defined and linked to the placeholder operation 50 by counter identification 72. The counter 70 is initialized to hold the number of predicate computational operations 38 identified in decision block 58, in this case: two.

Figure 8:
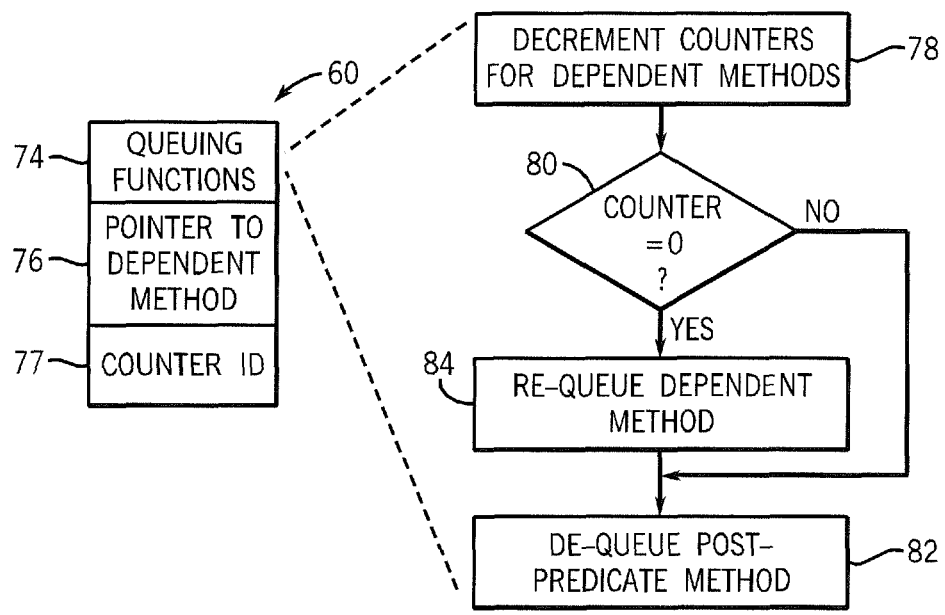
FIG. 8 is a figure similar to that of FIGS. 4 and 6 showing an example synchronization operation placed in a queue when there is a data dependency between pending computational operations.

Referring now to FIG. 8, the synchronization operations 60 will also generally provide for queuing functions 74, as will be described, in addition to pointers 76 to the dependent method (in this case the computational operation 32 of C.method 3(A B)), for example, as identified by its pointer 40. The synchronizing operations 60 also provide a counter identification 77 identifying one or more counters 70 of dependent computational operations (in this case the counter 70 of computational operation 32 of C.method 3(A B)). Thus, the computational operation 32 of C.method 3(A B) is effectively stalled waiting for completion of the predicate computational operations 32 on which it relies for data.

Figure 9:
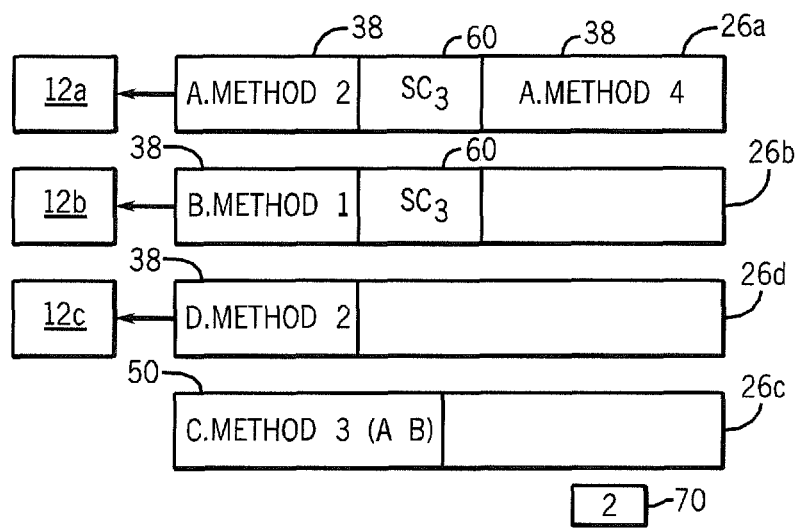
FIG. 9 is a figure similar to that of FIG. 7 showing continued execution of non-dependent computational operation while the dependent computational operation waits.

Referring momentarily to FIG. 9, despite the stalling of computational operation 32 of C.method 3(A B), other independent operations subsequent to computational operation 32 of C.method 3(A B) and other concurrent operations not part of this dependency may continue to execute in parallel. For example, a succeeding computational operation D.method 2 may be enrolled in queue 26d and associated with processor 12c for parallel execution and succeeding copies of computational operation A.method 4 serialized into queue 26a with similarly grouped pending computational operations (e.g. A.method 2). Thus, parallelization does not cease with the occurrence of this dependency.

The latter grouping of the computational operations A.method 2 and A.method 4 honors the write-write dependency between these operations.

Figure 10:
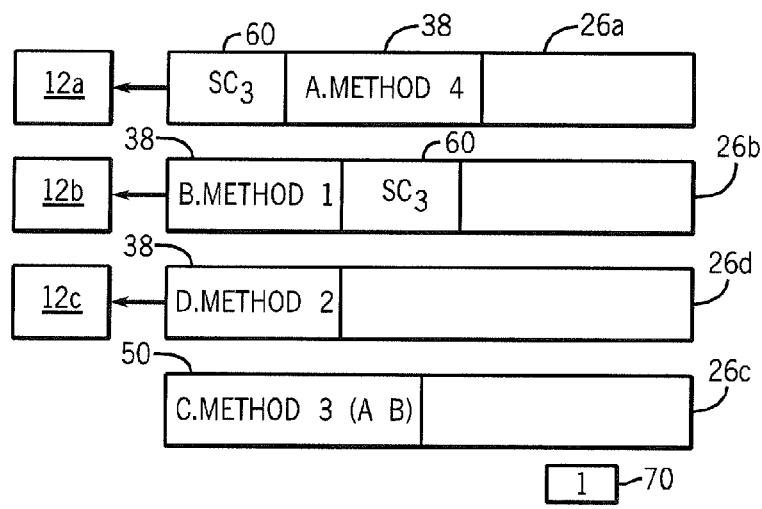
FIG. 10 is a figure similar to that of FIG. 9 showing the queues upon partial completion of predicate computational operations.
Figure 11:
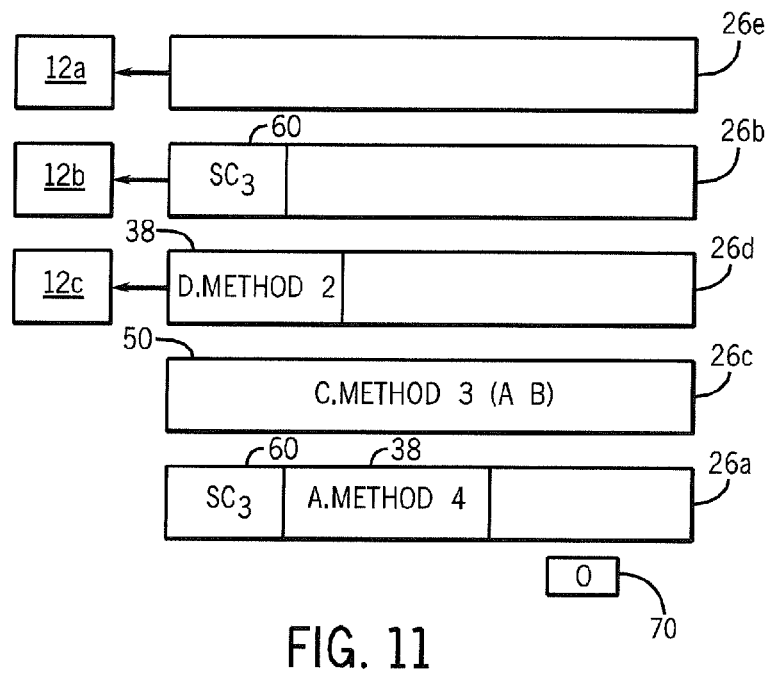
FIG. 11 is a figure similar to that of FIG. 10 showing the a de-queuing of post-predicate computational operations after a completed predicate computational operation.

Referring now to FIG. 10, at some future time, one, of the synchronization operations 60 (SC.sub.3) associated with program queue 26a (corresponding to the predicate computational operation A) arrives at the head of the queue 26a to be executed by processor 12a. Referring also to FIG. 8, this execution causes the synchronization operation 60 to decrement the counter 70 using counter identification 77. as indicated by process block 78, to now show that there is only one pending predicate computational operation 32. The synchronization operation 60 of SC.sub.3 then checks to see if the counter 70 has decremented to zero at decision block 80 and, if not, it de-queues itself and the rest of queue 26a from processor 12a as shown in FIG. 11 and as indicated by process block 82. This de-queuing removes not only synchronization operation 60 but also with other placeholder operations 38 in its queue 26a including A.method 4. It will be understood that it is implicit that the de-queuing only removes operations if there are operations in the queue. This de-queuing of all subsequent placeholder operations 38 or, 50 (post-predicate computational operations) reflects an inherent write-read dependency presented by these computational operations in a given queue 26, for example, the write-read dependency of A.method 4 on C.method 3(A B).

Figure 12:
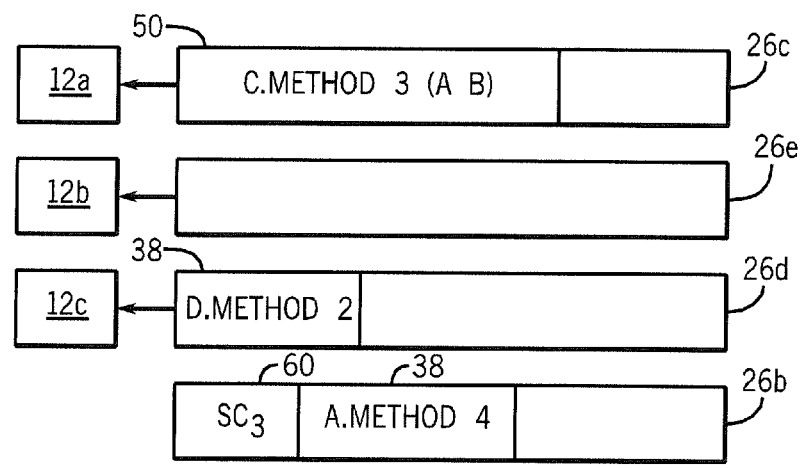
FIG. 12 is a figure similar to that of FIG. 11 showing a re-queuing of the dependent computational operation upon completion of the predicate computational operations.
Figure 13:
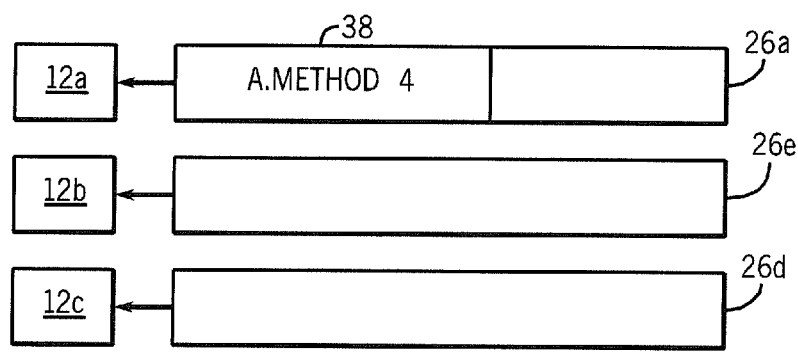
FIG. 13 is a figure similar to that of FIG. 12 showing a re-queuing of the de-queued post-predicate computational operations upon completion of the dependent computational operation.

Referring now to FIG. 8 and FIG. 11, after the time represented by FIG. 10, synchronization operation 60 associated with program queue 26b also arrives at the head of queue 26b, and decrements the counter 70 using counter identification 77. In this case, at decision block 80 of the synchronization operation 60, the counter is at zero indicating that all predicate computational operations have been complete and so the synchronization operation 60 proceeds to process block 84 and re-queues the dependent computational operation of C.method 3(A B) using the pointer 76 as shown in FIG. 12. Referring still to FIG. 12. the placeholder operation 50 for computational operation 32 of C.method 3(A B) then resumes execution at process block 90. When computational operation 32 of C.method B) has completed execution of its method, it re-queues the queues 26a and 26b of predicate computational operations process block 92 and per Fig. 13. It will be understood that it is implicit that process block 92 executes only if there are predicate computational operations that were previously de-queued that thus can be re-queued. The computational operation 32 of A.method 4 may thus execute only after any read by computational operation 32 of C.method 3(A, B) is complete, thus honoring the write-read dependency of A.method 4 on C.method 3(A, B).

Figure 14:
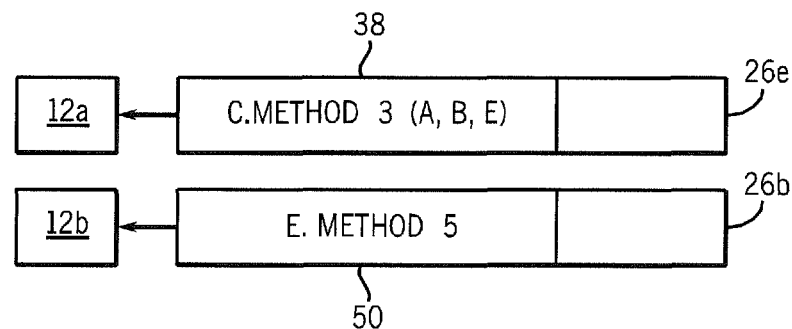
FIG. 14 is a figure similar to that of FIG. 12 showing a computational operation exhibiting a write-read dependency with a queued computational operation that is not currently dependent on other computational operations.
Figure 15:
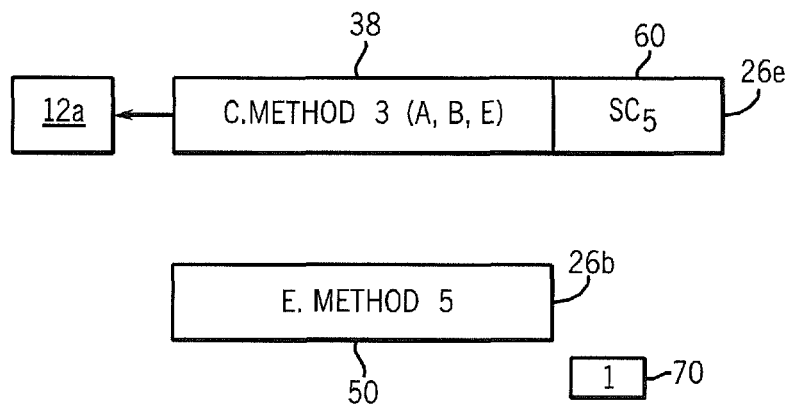
FIG. 15 is a figure similar to that of FIG. 14 showing the insertion of a synchronizing operation and a de-queuing of the dependent computational operation.

Referring now to FIG. 14, unlike the case described above with respect to Fig, 11, a write-read dependency may occur with respect to a pending computational operation that in itself is not dependent on other predicate operations. Thus, for example a new computational operation 32 of E.method 5 may be received that exhibits a write-read dependency with respect to pending computational operation 32 of C.method 3 (A, B, E). In this case, the placeholder operation 50 of E.method 5 executes the process box 56, 58 and 62 as described above with respect to FIG. 6, and de-queues a synchronization operation 60 of $SC_5$ into the queue 26e and de-queues itself into queue 26c. Counter 70 is incremented to indicate the number of predicate operations (1) on which this de-queued computational operation depends as described above. The processing of the computational operation 32 of C.method 3 (A, B, E) then proceeds until the synchronization operation 60 of $SC_5$ is executed. At this time, process box 78, 80, 84, and 82 (per FIG. 8) are executed allowing re-queuing of the placeholder operation 50 of E.method 5 and a decrementing of the counter 70 back to zero. Note that this process will typically not require the de-queuing of operations in queue 26e and subsequent to $SC_5$ per process block 82 of FIG. 8.

It will be appreciated that alternatively two different types of synchronization operations 60 may be used for read-write and write-read dependencies if desired, for example, to eliminate process block 82 in this latter case for efficiency.

As described in the above referenced serialization patent, the invention may also "instrument" the shared memory 18 to detect violations in any assumptions that computational operations 32 have disjoint data accesses, this instrumentation permitting correction or learning of the parallelization process. In the above description and the claims, "predicate" and "dependent" are used simply for clarity and do not limit the computational operations other than to indicate that these computation operations are executed either earlier or later than the given computation operation in the serial execution order and hence there may be a read or write dependency. The phrase "serial execution order" refers to the order the parallelized program would execute if not parallelized, and the term "queue" is intended to cover any order communication structure including a hardware stack, a linked list, a set of address sequential data, etc.

It will be understood that additional synchronization operations 60 may be placed into a queue 26 that already has synchronization operations 60 in it, and that all continuous runs of the synchronization operations 60 in a queue 26 may be executed before de-queuing of the synchronization operation 60 as long as there are no intervening non-synchronization or placeholder operations 38 or 50. This allows multiple reads of an object to proceed concurrently but forces writes to proceed sequentially.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A method of parallel execution of a program on a multi-processor computer having memory, the program having a serial execution order, the method comprising the steps of:

(a) identifying, in the program, a plurality of computational operations potentially writing data in memory read by other predicate computational operations or potentially reading data in memory written by other predicate computational operations, where that writing or reading would create a data dependency;

(b) providing a set of execution queues holding computational operations for ordered execution by associated processors, each processor adapted to execute any computational operation in the program;

(c) assigning a given computational operation to a given execution queue associated with a given processor based on an identity of a first data set accessed by the given computational operation at a point of the given computational operation in the serial execution order, wherein the identity of the first data set relates to addresses of data in the first data set;

(d) searching at least two execution queues other than the given execution queue to identify an uncompleted predicate computational operation on which the given computational operation is data dependent, the identification of the uncompleted predicate computational operation being based on an identity of a second data set accessed by the given computational operation at a point of execution of the given computational operation in the serial execution order, where the second data set is also accessed by the uncompleted predicate computational operation;

(e) when the searching does not find the uncompleted predicate computational operation, assigning the given computational operation for execution on a processor; and (f) when the searching does find the uncompleted predicate computational operation, delaying assigning the given computational operation for execution on a processor until completion of execution of the uncompleted predicate computational operation.

2. The method of claim 1 wherein step (d) enrolls synchronizing operations in other execution queues holding an uncompleted predicate computational operation, and wherein execution of the given computational operation is delayed until all of the synchronizing operations in said other execution queues have been executed by the processors associated with said other execution queues.

3. The method of claim 2 wherein the synchronizing operations update a counter as they are executed, the counter providing an indication when its number of updates equals a number of uncompleted predicate computational operations identified in step (d) so that the given computational operation from the given execution queue may be assigned to a processor upon the indication.

4. The method of claim 2 further comprising delaying execution of later predicate computational operations positioned after a synchronizing operation in queue order, until completion of the given computational operation.

5. The method of claim 4 wherein a given synchronizing operation associated with the given computational operation, when executed, prevents execution of later predicate computational operations in an execution queue holding the given synchronizing operation until completion of the given computational operation.

6. The method of claim 1 wherein the plurality of computational operations are selected from the group consisting of: program functions and program object methods.

7. The method of claim 1 wherein the given computational operation is associated with an instantiated software object and wherein step (c) assigns the given computational operation to the given execution queue based on an instantiation number.

8. The method of claim 1 wherein steps (a) (f) are performed only if at least one processor that can be assigned an execution queue is not executing computational operations.

9. The method of claim 1 wherein step (a) identifies, in the program, a plurality of computational operations writing data in memory read by other predicate computational operations.

10. The method of claim 1 wherein step (a) identifies, in the program, a plurality of computational operations reading data in memory written by other predicate computational operations.

11. The method of claim 1 wherein, after step (f), the given computational operation is assigned for execution with a different processor than the given processor.

12. The method of claim 1 wherein the first and second data sets are determined from data dependent on memory addresses of data in the first and second data sets.

13. A multi-processor computer executing a parallelizing software program stored in non-transitory computer readable memory to process a target program having computational operations with a serial execution order and executable on the multi-processor computer, each processor adapted to be able to execute all of the computational operations in the target program, the parallelizing software program, when executed on the multi-processor computer, modifying the target program to:

(a) cause the target program to create a set of execution queues holding the computational operations and accessible by the target program during execution of the target program and assignable to an associated processor for execution of the computational operations in a queue order;

(b) incorporate serializing program elements into the target program to execute before identified computational operations of the target program in the serial execution order to:

(i) assign a given computational operation to a given execution queue associated with a given processor based on identification of an identity of a first set of data accessed by the given computational operation at a point of the given computational operation in the serial execution order, wherein the identity of the first data set is dependent on addresses of data in the first data set;

(ii) search at least two execution queues other than the given execution queue to identify at least one uncompleted predicate computational operation on which the given computational operation is data dependent based on an identity of a second data set accessed by the given computational operation in common with the at least one uncompleted predicate computational operation at a point of execution of the given computational operation in the serial execution order;

(iii) when the search does not find the at least one uncompleted predicate computational operation, assign the given computational operation for execution on a processor; and (iv) when the search does find the at least one uncompleted predicate computational operation, delay assigning the given computational operation for execution on a processor until completion of execution of the at least one uncompleted predicate computational operation.

14. The multi-processor computer of claim 13 wherein, after step (iv), the given computational operation is assigned for execution with a different processor than the given processor.

15. The multi-processor computer of claim 13 wherein the first and second data sets are determined from data dependent on memory addresses of the first and second data sets.

16. A multi-processor computer executing a parallelizing software program stored in non-transitory computer readable memory for execution of a target program of computational operations having a serial execution order and executable on the multi-processor computer, each processor adapted to be able to execute any of the computational operation in the target program, the parallelizing software program comprising:
  (a) queue generating instructions to create a set of execution queues holding the computational operations of the target program and accessible by the parallelizing software program during execution of the target program and assignable to a given processor for execution of the computational operations in a queue order; and
  (b) serializing instructions executing before identified computational operations of the target program in the serial execution order to:
    (i) assign a given computational operation to a given execution queue based on an associated first set of data accessed by the given computational operation at a point of the given computational operation in the serial execution order, wherein an identity of the first data set is related to addresses of data in the first data set;
    (ii) search at least two execution queues other than the given execution queue to identify at least one uncompleted predicate computational operation on which the given computational operation is data dependent, the identification of the at least one uncompleted predicate computational operation being based on an identity of a second data set accessed by the given computational operation at a point of execution of the given computational operation in the serial execution order, where the second data set is also accessed by the at least one uncompleted predicate computational operation;
    (iii) when the search does not find the at least one uncompleted predicate computational operation, assign the given computational operation for execution on a processor; and
    (iv) when the search does find the at least one uncompleted predicate computational operation, delay assigning the given computational operation for execution on a processor until completion of execution of the at least one uncompleted predicate computational operation.

* * * * *